Patented May 29, 1934

1,960,493

UNITED STATES PATENT OFFICE

1,960,493

METHOD OF OBTAINING GLAND EXTRACTS

Oliver Kamm, Thomas B. Aldrich, and Irvine W. Grote, Detroit, Mich., assignors to Parke, Davis & Company, Detroit, Mich., a corporation of Michigan No Drawing. Application December 31, 1927, Serial No. 244,039

17 Claims. (Cl. 167—74)

The invention relates to new and useful improvements in purification and isolation of the active principles of certain glandular products, and in particular of the posterior lobe of the pituitary gland.

An aqueous extract containing the therapeutically active constituents of the infundibular part (or posterior lobe) of the pituitary gland is at the present time made and marketed by various manufacturers under different trade-names such as Pituitrin, Infundin, Pituglandol, Pituitary Extract, Pituitary Liquid, etc. This extract, when administered hypodermically, has the effect of increasing the blood pressure, stimulating uterine contractions, and affecting renal secretion.

Although various claims have been made concerning the active principles of the posterior lobe of the pituitary gland it is not known definitely whether the various physiological responses are due to a single or to the presence of several hormones. The basis for the unitarian theory is the work of the well-known pharmacologist Abel and his co-workers. (J. Pharm. and Exp. Ther. 20, 65 (1922) and 22, 289 (1923).) The situation is ably summarized in a research from the U. S. Hygienic Laboratory (J. Pharm. and Exp. Ther. 24, 391–403 (1924—5)) and additional evidence is presented in favor of chemical unity by these government workers.

We have been unwilling to admit that these manifold physiological activities above enumerated can be due to a single hormone and the primary object of our invention is to definitely separate the specific hormones, to obtain them in highly purified form, and to make them available (for the first time) to the medical profession as separate remedial agents. In all of this we have been successful since we have definitely separated the blood-pressure-raising (pressor) hormone from the uterus contracting (oxytocic) hormone and we have obtained these separated hormones in highly purified form.

Another object is to provide an improved process for the purification and isolation of the active principles of grandular products, which process is particularly advantageous in preparing extracts from the pituitary gland.

In general the improved process consists in treating the protein substance with an organic carboxylic acid, preferably of low molecular weight such as acetic or propionic acid but in relatively high concentration and then fractionally precipitating by the addition of various organic precipitants such as acetone, ether etc. Some of the products obtained in the various steps of the precipitation contain the active principles in relatively high concentrations and are relatively free from non-active protein substances.

In applying our process to the extraction of the posterior lobe of the pituitary gland, it is preferable to start out with a partially purified material, such for example as that described in United States Patent No. 1,373,551. The primary solvent used is an organic mono-carboxylic acid preferably of low molecular weight such as acetic or propionic acid but in relatively high concentration. For practical purposes we find the glacial acetic acid of commerce (98–100% acetic acid) to be the most satisfactory. Such an acid when applied to a salted-out product such as is described in United States Patent No. 1,373,551 will extract the active principles and only a small part of the contaminating protein material. The amount of foreign protein extracted is dependent upon the moisture content of the acid, for example 98% acetic acid will extract appreciable quantities of foreign proteins whereas 100% acetic acid will dissolve only small amounts of protein material although it will extract most of the physiologically active compounds.

The acetic acid extract may then be separated by filtration from undissolved foreign gland material, and from the filtrate a physiologically active fraction in a somewhat purified form may be precipitated by the addition of organic liquids as for example by ether or acetone.

We find that the acetic acid extract may profitably be subjected to fractional precipitation by the gradual addition of acetone or ether. When this is done the first few fractions are found to be relatively inert but successive fractions show an increase in physiological activity. By the use of a variety of organic precipitants we are able not merely to separate inert proteins, but to separate the pressor principle from the oxytocic principle. Inert proteins are precipitated best by fractional precipitation of the solution by the addition of acetone; subsequently the pressor principle together with some of the oxytocic principle is precipitated in a succession of fractions by the addition of sulfuric ether, and finally the oxytocic principle is precipitated by the addition of a hydrocarbon such as low-boiling petroleum ether or gasoline. By several repetitions of the fractionation process it is possible to obtain the active principles in a high degree of purity.

As an example of the procedure for concentrating and refining the two principles from the original gland material, the following is given:

1. An aqueous extract of the posterior lobe of the pituitary gland is prepared by extracting 100 grams of the commercial acetone-desiccated gland material testing 50% of U. S. P. standard with 10 liters of ¼% acetic acid. The mixture is gradually heated to a temperature of about 95° C. during a half hour period, cooled quickly, and then filtered to remove the insoluble gland residue, which is reextracted with 1 liter of the acidified water in order to secure a fairly complete extraction. The combined filtrates should contain 100,000 international units of oxytocic activity and approximately an equal number of units of pressor activity.

2. The filtrate is then concentrated at a low temperature to a volume of one liter. Since the active principles in acid solution are stable toward oxidation by air, evaporation with the aid of a current of warm air is permissible.

3. The concentrated extract is treated with 550 g. of c. p. ammonium sulfate. The precipitate is filtered on a hardened filter paper, dried and powdered. The weight of salted-out product will be 20 to 40 grams according to the amount of salt present, an excess of which is not objectionable.

4. The salted-out product is extracted with successive portions of glacial acetic acid (99–100%) a total volume of 500 cc. of acetic acid being used. In order to secure an efficient extraction the following method may be applied. The salted-out product is divided into four equal part lots A, B, C, and D. Part lot A is extracted with seven times its weight of acid and this first extract set aside. A is then reextracted with a second portion of acid but this second extract is used for extraction of part lot B after which the second extract is combined with the first. In making the third extract lots A, B, and C are extracted in this respective order, and the procedure is continued in this manner until each fraction has been extracted four times before being discarded and a total of seven portions of acetic acid have been used. The amount of glacial acetic extracted material will be approximately 5 to 8 grams provided that care is taken to prevent undue exposure to the moisture of the air during the extraction process.

5. The acetic acid extract is now treated with 1250 cc. of sulfuric ether and 2500 cc. of petroleum ether, which treatment precipitates the active material completely. The precipitate is filtered off by suction, washed with ether, and dried. Its weight should be 5 to 10 grams varying with the water content of the acetic acid and a potency test by both the pressor method and the oxytocic method should demonstrate the presence of 80 to 90% of the activity contained in the original 100 grams of desiccated gland material. Ninety to ninety-five percent of the inert material has thus been removed by our process up to this stage. Assay shows the product to possess a potency of 450 to 900% of standard according to the weight, the oxytocic and pressor activities being practically balanced.

*Partial separation of the two active principles*

As a next step it is advantageous to remove a part of the oxytocic activity by the following simple process. A complete separation at this stage is not feasible because of the tendency of the protein fractions to absorb the oxytocic fraction.

5 g. of the material assaying 500–900% of the U. S. P. powder are dissolved in 250 cc. of 98% acetic acid at a temperature of 40° C. and precipitated immediately by the addition of 2½ volumes of sulfuric ether previously warmed to 30° C. The flocculent precipitate is allowed to settle rapidly (not over five minutes) and is filtered by suction, washed with ether and dried.

The pricipitation is immediately re-dissolved in 250 cc. of 98% acetic acid and precipitated as before. The recovered material will weigh 4.5 to 4.7 g.

The ether filtrate contains oxytocic activity together with traces of salts such as ammonium acetate. The active fraction may be precipitated by the addition of petroleum ether but the resultant solution is usually so difficult to filter that the following procedure is preferred.

The ether-acetic filtrates (above) are combined and refiltered through hardened filter paper and the clear filtrates are treated with 10 cc. of water (which must dissolve completely) and two volumes (about 3 liters) of petroleum ether. A fine mist is thrown out which carries down practically all the oxytocic activity and usually collects as a varnish on the sides and bottom of the container after standing for several hours or over-night. The clear liquid is decanted and the gummy precipitate dissolved in 50 cc. water and filtered free from fat. Based on solid content, this petroleum ether precipitate contains oxytocic material of a potency of 5,000 to 12,000% and not more than 3–4% of pressor activity per 100% oxytocic activity.

The following practical result has been duplicated many times. Ten grams of a partially purified solid assaying 600% oxytocic and 500% pressor activity yielded by this process 9.6 grams of a fraction assaying 500% pressor but only 325–375% oxytocic activity. However, the petroleum ether precipitate, taken up in 100 cc. water, had a solid content of 350 mg. and contained 50,000 to 60,000 units of oxytocic activity thus accounting for the oxytocic activity removed from the precipitate. Such a solution is suitable for subsequent use in purification of the oxytocic principle and also, after suitable dilution, for practical clinical use since it contains only small amounts of pressor activity.

*Fractionation of the pressor principle*

(a) 5 grams of partially separated material testing 500–900% by the pressor test but only approximately one-half this potency according to the oxytocic test, are dissolved in 100 cc. of 98% acetic acid at room temperature, and the solution is filtered by suction from a small amount of salt and other insoluble impurities.

(b) To the filtrate are added 40 cc. of acetone. The precipitate, consisting mainly of protein containing only a small amount of active material, is filtered off, washed with ether, and dried.

(c) The filtrate from (b) is treated with an additional 40 cc. of acetone and a second protein fraction is obtained as before although this fraction contains slightly more active material.

(d) The filtrate from (c) is treated with about 25 cc. of sulfuric ether and the precipitate filtered off and dried as before.

(e) The filtrate from (d) is treated with 125 cc. ether and the precipitate filtered off and dried. This fraction is more potent than (d) by both the pressor and oxytocic tests.

(f) The filtrate from (e) is treated with an excess (about 500 cc.) of sulfuric ether in order to precipitate the remainder of the pressor activity. This fraction is fairly active by the pressor test but less active by the oxytocic test thus plainly showing a separation of the active principles.

(g) The filtrate from (f) contains only a trace of pressor activity but contains the bulk of the oxytocic activity. The latter may be obtained by the addition of petroleum ether as already described. Due to the presence of moisture this fraction may precipitate as a gummy mass but can be obtained in the form of a white solid by solution in alcohol and precipitation with ether.

The results obtained by this fractionation method are shown in the following experiment selected at random from a large number of similar results.

30 grams of material assaying 750% by pressor and 375% by oxytocic test were treated with 600 cc. of 98% acetic acid and fractionated with the following results:

Table 1

| Fraction number | Amount and kind of solvent added | Assay of fraction | Weight of fraction |
|---|---|---|---|
| 1 | Acetic acid | Practically inert | 5.4 g. |
| 2 | 225 cc. acetone | 300% pressor / 150% oxytocic | 7.7 g. |
| 3 | 225 cc. acetone | 400% pressor / 200% oxytocic | 8.4 g. |
| 4 | 150 cc. ether | 750% pressor / 250% oxytocic | 1.9 g. |
| 5 | 750 cc. ether | 3125% pressor / 700% oxytocic | 4.2 g. |
| 6 | 4000 cc. ether | 1875% pressor / 1625% oxytocic | 1.0 g. |
| 7 | Petroleum ether | 120% pressor / 5000% oxytocic | 0.8 g. |
| | Total | | 29.4 g. |

In the above experiment 220,000 pressor units were recovered from a total of 225,000 and likewise 100,000 oxytocic units from a total of 122,000 shown by the initial assay.

Examination of the above table shows that fractions 2, 3, and 4 are relatively weak. They consist chiefly of protein material which naturally carries along an appreciable amount of activity. However, a separation and concentration of the two activities is taking place as is shown by the fact that fraction 4 is three times as potent by pressor as by oxytocic test, and the large fraction 5, is more than four times as potent by pressor as by oxytocic test. The oxytocic activity is accumulating in the residual solution and it is therefore to be expected that the last solid fraction (No. 6) will be comparatively potent in oxytocic activity also, since the oxytocic principle is not very soluble in ether.

*Refractionation and further concentration of the pressor principle*

The more potent of the separated fractions may be further concentrated by a repetition of the process already described, applying the same to the individual fractions.

The following laboratory experiment illustrates the results obtained in actual practice.

7 grams of material assaying 3125% by pressor test and 700% of oxytocic test (equivalent to fraction 5, Table 1) were dissolved in 210 cc. of 98% acetic acid and refractionated with the following results.

Table 2

| Fraction number | Amount and kind of precipitant added | Assay results | Weight of fraction |
|---|---|---|---|
| 1 | 210 cc. acetone | 1000% pressor / 150% oxytocic | 1.35 g. |
| 2 | 105 cc. acetone | 1625% pressor / 400% oxytocic | 0.95 g. |
| 3 | 75 cc. ether | 3000% pressor / 500% oxytocic | 1.15 g. |
| 4 | 300 cc. ether | 5000% pressor / 750% oxytocic | 2.40 g. |
| 5 | 600 cc. ether | 2500% pressor / 2000% oxytocic | 0.52 g. |
| 6 | Petroleum ether | 150% pressor / 4000% oxytocic | 0.25 g. |

Repeated fractionation of the pressor fraction has resulted in obtaining material having a potency eighty times as great as the U. S. P. standard, while the oxytocic principle has been obtained having a potency one hundred and fifty times that of the above standard. The pressor principle as obtained by the above described fractionation process is a white solid, freely soluble in water and has been named beta-hypophamine. It can be obtained substantially free from the oxytocic principle, although it always has a slight effect on smooth muscle due probably to the fact that the pressor principle itself possesses this property to a slight degree. The oxytocic principle which is named alpha-hypophamine resembles the pressor principle in every way except that it is more soluble in organic solvents and it possesses only the oxytocic activity of the posterior lobe. It can be obtained substantially free from the pressor principle by repeated fractionation in the manner described above.

The two products, alpha-hypophamine and beta-hypophamine are as suitable for clinical application and are much more valuable than other pituitary extracts which contain both principles. Since the two hormones of the pituitary gland are separated, it is possible to administer one without the other and a physician can choose the particular hormone that is desirable for a specific condition without administering any other undesirable principle. For example, in many obstetrical cases the patient suffers from a high blood pressure and yet in order to secure the effect of the uterus contracting principle (alpha-hypophamine), it has been necessary in the past to administer simultaneously the blood-pressure-raising principle (beta-hypophamine) since these two principles have always heretofore been associated in all pituitary gland extracts. Similarly in the treatment of asthmatic conditions where the pressor principle (beta-hypophamine) is desired it has been necessary to administer simultaneously the undesirable oxytocic principle (alpha-hypophamine) which can produce an objectionable constriction of the bronchioles. In the treatment of diabetes insipidus it has similarly been necessary to administer the two hormones when only one was essential and the second one may have called forth undesirable side reactions. In each of the cases mentioned above, it is now possible to administer a single hormone having the desired characteristics without administering any other undesirable hormone.

Our process for obtaining the two principles from the posterior lobe of a pituitary gland does not injure or destroy the activity of either principle. This is proved from the fact that when the various fractions obtained by our process are again mixed, a product is obtained which is physiologically indistinguishable from the original pituitary extract.

Although we prefer to apply our process to the salted-out product obtained from the ordinary commercial pituitary extracts, we find that the process can also be applied to the gland material directly, although this process is not in general as satisfactory as the one specifically described above.

One of the essential features of our process resides in the choice of the organic liquid for dissolving the active principle prior to the fractional precipitation thereof. In general the liquids which can be used for this purpose must act chemically with the active principles due possibly to a salt formation but must be a poor solvent for foreign protein material. As indicated above, the most desirable material is glacial acetic acid but it is not entirely essential that the acid should be free from water and in some instances it is possible to obtain separation of the active principles when using acetic acid containing 10 to 20% of water or even more. In such cases, however, the protein material in the salted-out product is completely soluble and a more tedious precipitation with acetone and ether must be made in order to again secure a separation of these inert proteins.

In place of acetic acid other organic acids, such as propionic and butyric, can be used and in such cases it has been found that propionic acid containing about 5% water and the butyric acid containing about 10% water are substantially equivalent to 98-100% acetic acid. It is also possible to use mixtures of alcohol and organic acids with high concentrations of acid, although in general such solutions are not as satisfactory for complete separation of the active principles as those heretofore enumerated.

In the foregoing description, it has been shown that the extracts from the posterior lobe of the pituitary glands can be separated into two separate and distinct products, each of which contains a specific hormone. We have described a process adaptable for the separation of these hormones, which process however, has a wider application since it is useful in the concentration and refinement of other gland materials wherein it is desired to separate the activity from inert protein materials.

What we claim as our invention is:

1. The process of obtaining a plurality of active principles from the posterior lobe of the pituitary gland which consists in treating a pituitary gland extract containing a plurality of principles with glacial acetic acid to form a solution, adding acetone to eliminate the protein material, separating the precipitate from the solution, subsequently adding sulfuric ether to the filtrate to precipitate a fraction containing more pressor principle than oxytocic principle separating the precipitate and finally adding petroleum ether to the resulting filtrate to precipitate a fraction containing more oxytocic principle than pressor principle.

2. A composition of matter comprising an extract of the posterior lobe of the pituitary gland a white, water soluble solid containing the pressor principle, substantially free from the oxytocic principle and having the physiological property of raising the blood pressure when administered hypodermically.

3. A composition of matter comprising an extract of the posterior lobe of the pituitary gland a white, water soluble solid containing the oxytocic principle, substantially free from the pressor principle and having the physiological property of contracting uterine muscle when administered hypodermically.

4. The process of separating the hormones of the posterior lobe of the pituitary gland comprising the treatment of gland material from the posterior lobe of the pituitary gland with an aliphatic monocarboxylic acid of low molecular weight and high concentration forming a solution of the hormones, and fractionally precipitating the hormones from said solution by successive additions of acetone and ether whereby the ratio of pressor hormone to oxytocic hormone is varied in successive precipitates.

5. The process of separating the hormones of the posterior lobe of the pituitary gland comprising the treatment of gland material from the posterior lobe of the pituitary gland with substantially glacial acetic acid forming a solution of the hormones, and fractionally precipitating the hormones from said solution by successive additions of acetone and ether whereby the ratio of pressor hormone to oxytocic hormone is varied in successive precipitates.

6. The process of separating the hormones of the posterior lobe of the pituitary gland comprising the treatment of gland material from the posterior lobe of the pituitary gland with an aliphatic monocarboxylic acid of low molecular weight and high concentration forming a solution of the hormones, and fractionally precipitating the hormones from said solution by successive additions of sulphuric ether and petroleum ether whereby the ratio of pressor hormone to oxytocic hormone is varied in successive precipitates.

7. The process of separating the hormones of the posterior lobe of the pituitary gland comprising the treatment of gland material from the posterior lobe of the pituitary gland with substantially glacial acetic acid forming a solution of the hormones, and fractionally precipitating the hormones from said solution by successive additions of sulphuric ether and petroleum ether whereby the ratio of pressor hormone to oxytocic hormone is varied in successive precipitates.

8. The process of separating the hormones of the posterior lobe of the pituitary gland comprising the treatment of gland material from the posterior lobe of the pituitary gland with an aliphatic monocarboxylic acid of low molecular weight and high concentration forming a solution of the hormones, and fractionally precipitating the hormones from said solution by successive additions of acetone, sulphuric ether and petroleum ether whereby the ratio of pressor hormone to oxytocic hormone is varied in successive precipitates.

9. The process of separating the hormones of the posterior lobe of the pituitary gland comprising the treatment of gland material from the posterior lobe of the pituitary gland with substantially glacial acetic acid forming a solution of the hormones, and fractionally precipitating the hormones from said solution by successive additions of acetone, sulphuric ether and petroleum ether whereby the ratio of pressor hormone to oxytocic hormone is varied in successive precipitates.

10. A composition of matter comprising an extract of the posterior lobe of the pituitary gland, a white, water soluble solid containing the oxytocic hormone substantially free from the pressor hormone, concentrated to such an extent that 1 international unit of oxytocic activity is represented by 0.1 milligram or less of said extract and having the physiological property of raising the blood pressure when administered hypodermically.

11. A composition of matter comprising an extract of the posterior lobe of the pituitary gland, a white, water soluble solid containing the pressor hormone substantially free from the oxytocic hormone concentrated to such an extent that 1 international unit of pressor activity is represented by 0.1 milligram or less of said extract and having the physiological property of contracting uterine muscle when administered hypodermically.

12. In the process of separating the hormones of the posterior lobe of the pituitary gland, the steps comprising the fractional precipitation of the hormones from a solution containing said hormones by successive additions of acetone and ether whereby the ratio of pressor hormone to oxytocic hormone is varied in successive precipitates.

13. In the process of separating the hormones of the posterior lobe of the pituitary gland, the steps comprising the fractional precipitation of the hormones from a solution containing said hormones by successive additions of sulphuric ether and petroleum ether whereby the ratio of pressor hormone to oxytocic hormone is varied in successive precipitates.

14. In the process of separating the hormones of the posterior lobe of the pituitary gland, the steps comprising the fractional precipitation of the hormones from a solution containing said hormones by successive additions of acetone, sulphuric ether and petroleum ether whereby the ratio of pressor hormone to oxytocic hormone is varied in successive precipitates.

15. In the process of separating the oxytocic and pressor hormones of the posterior lobe of the pituitary gland, the steps comprising the fractional precipitation of the hormones from a solution containing said oxytocic and pressor hormones by successive additions of a reagent of the class consisting of acetone, sulphuric ether, petroleum ether and gasoline.

16. The process for separating the oxytocic and pressor hormones of the posterior lobe of the pituitary gland comprising the treatment of the gland material from the posterior lobe of the pituitary gland with a reagent of the class consisting of acetic acid, propionic acid, butyric acid and mixtures of alcohol and organic acids with high concentration of acid, removing the liquid from the solid matter and fractionally precipitating said hormones from said liquid by successive additions of a reagent of the class consisting of acetone, sulphuric ether, petroleum ether and gasoline.

17. The process of obtaining concentrates of the posterior lobe of the pituitary gland comprising the extraction of the gland material from the posterior lobe of the pituitary gland with a reagent of the class consisting of acetic acid, propionic acid, butyric acid and mixtures of alcohol and organic acids with high concentration of acid, removing the liquid from the solid matter, and precipitating a concentrate from the extract with a reagent of the class consisting of sulphuric ether and petroleum ether.

OLIVER KAMM.
THOMAS B. ALDRICH.
IRVINE W. GROTE.